United States Patent [19]
Walker et al.

[11] Patent Number: 4,954,970
[45] Date of Patent: Sep. 4, 1990

[54] VIDEO OVERLAY IMAGE PROCESSING APPARATUS

[76] Inventors: James T. Walker, 224 Seale Ave., Palo Alto, Calif. 94301; Marvin L. Kausch, 2790 Wexford Dr., San Jose, Calif. 95132

[21] Appl. No.: 179,565

[22] Filed: Apr. 8, 1988

[51] Int. Cl.[5] .................................... G06F 15/66
[52] U.S. Cl. ...................... 364/521; 364/518; 340/703; 358/78
[58] Field of Search .............. 364/521, 518, 522; 340/734, 747, 731, 721, 706, 703; 358/22, 78, 81

[56] References Cited

U.S. PATENT DOCUMENTS

| 4,578,766 | 3/1986 | Caddy | 364/521 |
| 4,660,029 | 4/1987 | Houda et al. | 340/744 |
| 4,682,297 | 7/1987 | Iwami | 364/521 |
| 4,710,806 | 12/1987 | Iwai et al. | 358/81 |
| 4,731,609 | 3/1988 | Reynolds et al. | 340/747 |
| 4,736,330 | 4/1988 | Capowski | 364/518 |
| 4,747,074 | 5/1988 | Yashida | 364/900 |
| 4,768,157 | 8/1988 | Chauvel et al. | 364/521 |

Primary Examiner—Gary V. Harkcom
Assistant Examiner—Phu K. Nguyen
Attorney, Agent, or Firm—Robert K. Stoddard

[57] ABSTRACT

A predominatly hardware-based system for rapidly generating overlay images by painting techniques using a host computer with appropriate graphics-generation operator interface, and for manipulating overlay images with respect to a background image. The system provides for rapid, convenient control of such imaging aspects as color alteration, repositioning the overlays on the background, and predetermining the amount of mask protection to be associated with each image pixel. The system can be readily realized, using available integrated crcuits, in the form of a host-computer plug-in accessory. A bidirectional multiple bus structure serves to interconnect the circuit boards, permitting convenient host-software-controlled configuration of the system.

31 Claims, 4 Drawing Sheets

VIDEO OVERLAY IMAGE PROCESSING APPARATUS

BACKGROUND OF THE INVENTION

The present invention relates generally to the processing of electronic images for video display, more particularly to the processing of computer-generated video images, and especially to the manipulation of complex video images involving the presentation of overlay images over a background image.

The use of computers to generate video images has become widespread and has brought with it the need to efficiently generate and manipulate such images. When such images involve the use of the technique of overlay, in which a background image is displayed with one or more secondary images overlaying various parts of the background image, the operator needs to be provided with several convenient and efficient controls so that the final display image can be produced in the minimum time.

The colors used in displaying the overlay images must be readily changeable as needed to enhance the appearance of the overlay images with respect to the background image. The position of the overlay images must also be easily altered by the operator. Further, it must be possible to provide some degree of protection to the various image portions such that an overlay image can be prevented from obscuring significant details of the image(s) lying beneath it.

Computer systems for handling these matters have in the past relied to a significant extent on construction of a complex display image including overlays by the use of a single image plane representing the complex display image in memory. In order to alter the various portions of the image to insert overlays, the host computer utilized software to serially read each of the data points in the region of the memory plane where changes were to be made, and then wrote new data in this region to represent the altered image.

Such software-intensive techniques were slow and cumbersome, and provided no backup capability, since the original data values in the image memory plane were lost as soon as new data was written into the affected addresses.

SUMMARY OF THE INVENTION

An object of this invention is to provide a rapid and convenient system for originating, altering, and manipulating computer-generated graphic video displays.

A further object of this invention is to provide such a system in a form which is principally hardware-based.

A further object of this invention is to provide such a system with five to ten times the speed of the prior software-based image processing systems.

A further object of this invention is to provide a system for orginating, altering, and manipulating one or more overlay images to be displayed over a background image.

A further object of this invention is to provide a system for the rapid generation of overlays which are produced by an operator using computer-painting techniques carried out with the use of a graphic tablet or mouse-type input.

A further obect of this invention is to provide a system according to the immediately preceding object wherein means are provided to correct mistakes without destroying the existing image.

A further object of this invention is to provide a system for originating, altering, and manipulating one or more overlay images wherein means are included for altering the colors of the image in accordance with a predetermined transformation relationship.

A further object of this invention is to provide a system for originating, altering, and manipulating one or more overlay images wherein means are included for altering the density of the image in accordance with a predetermined transformation relationship, particularly for the purpose of conforming to the non-linear relationship of brightness and signal magnitude in standard video display devices.

A further object of this invention is to provide a system for originating, altering, and manipulating one or more overlay images with the capability to selectively mask various portions of the images to control the degree to which one image can obscure another.

A further object of this invention is to provide a system for originating, altering, and manipulating one or more overlay images with the capability of moving an overlay image with respect to the background image.

A further object of this invention is to provide a system for originating, altering, and manipulating one or more overlay images over a background image wherein an overlay image may be stored as a new background image at any stage, whereby a complex image can be created as many layers of overlay.

A further object of this invention is to provide a system for originating, altering, and manipulating one or more overlay images in accordance with the immediately preceding object wherein it is possible to delay the storage of a background image by a preselected time interval.

To the above ends, a video image generation and manipulation system according to the present invention utilizes at least three separate bidirectional busses for communicating the components of three images: a background image stored in a first memory, an overlay image stored in a second memory, and an image mixer.

Each bus has five groups of lines for representing images by five components. The color intensities are represented by three of these components utilizing either the RGB (red-green-blue) primaries or the YUV color triad utilized in video broadcasting. The other two components are alpha (symbolized as A), the overly image density, and frisket (symbolized as F), a parameter which represents the maximum overlay image density permitted on each pixel of the background image. Since each of these five components is represented by 8-bit data, the busses each provide 8 parallel lines for each of the five components, a total of 40 lines per bus.

The rapid generation of original artwork using a graphics tablet or a mouse is facilitated by the provision of a fast-painting architecture which permits the rapid creation of an overlay image on a color-by-color basis. During the application of each successive color, the affected image areas can be restored to their preceding background color so as to undo any mistakes which are created. As each color is completed, the resulting complex image can be stored as new background image.

The system can also be used to superimpose an overlay image from an overlay memory on a background image from a background memory. Soft edges can be created on the overlay image such that the transitions at the edges are smooth. The overlay image(s) can be moved with respect to the background image. Since the images are represented by an image density component A which is separate from the color components, it is possible to conveniently remap image density in a manner which compensates for the non-linear relationship between signal magnitude and video brightness in television broadcasting. Similarly, the various colors used in the overlay can be partly or wholly derived from a color map, such that all image areas using a mapped color can be simultaneously changed to a different color merely by changing a single definition in the color map.

BRIEF DESCRIPTION OF THE DRAWING

The above and other features, objects and advantages of the present invention together with the best mode contemplated by the inventors thereof for carrying out their invention will become more apparent from reading the following description of the invention and studying the associated drawing, the various figures of which represent.

DETAILED DESCRIPTION OF THE PRESENT INVENTION

Figure 1:
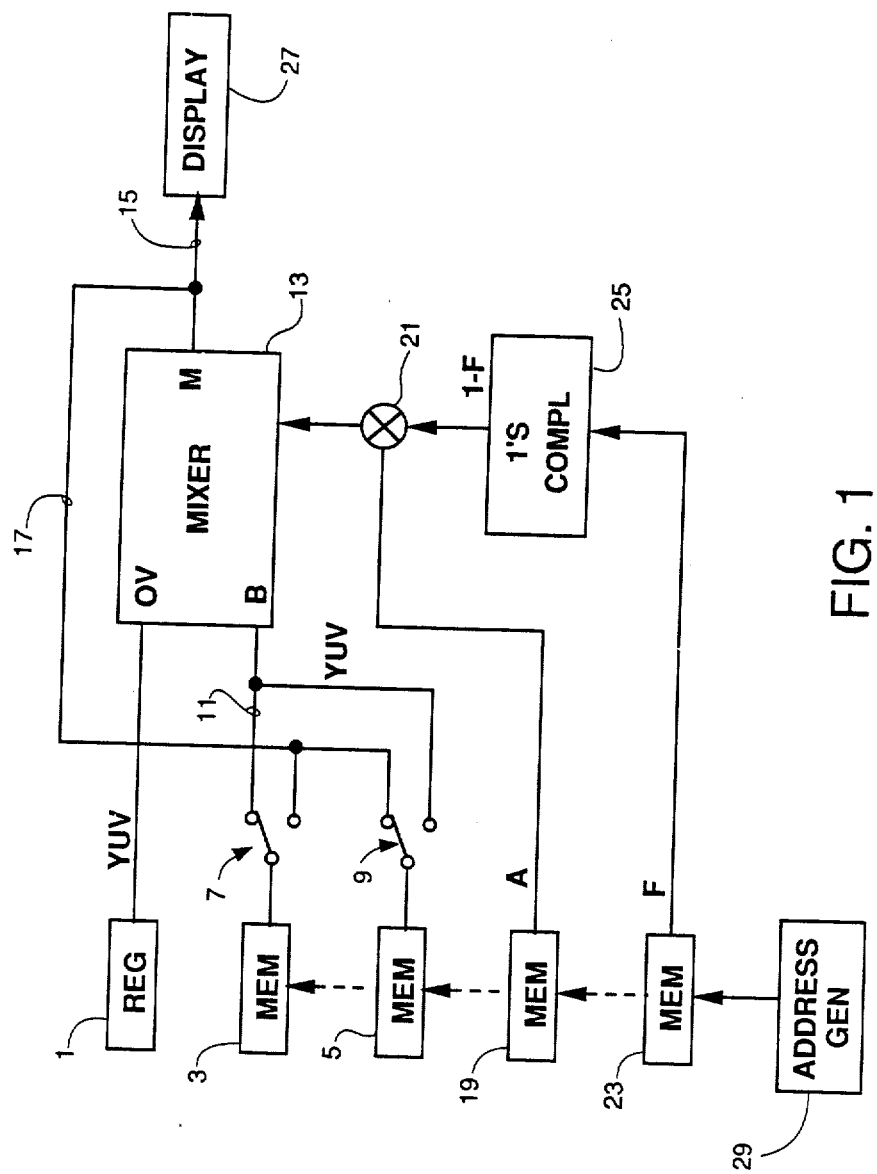
FIG. 1 is a block-schematic diagram of an embodiment of the invention as it would be used for painting an overlay image.

FIG. 1 presents an embodiment of the present invention as it would be used to facilitate the creation of an original overlay image using a graphics tablet or a mouse together with a host computer (not shown).

A regsiter 1 is used to store the paint color currently in use by the operator in three-component form, using either the RGB (red-gree-blue) primary color system or the YUV color triad which is used in video broadcasting. Since each of these components is represented by 8-bit data, register 1 must store 24 bits of data to represent the current paint color. The appropriate data for the color selected by the operator is written into register 1 by the host computer.

A pair of memory devices 3 and 5 are used to store and present a background image under the control of a pair of host-controlled switches 7 and 9, each of which has two states as shown. With switch 7 in the state shown, memory device 3 is connected to the background image input (labeled B) of a mixer 13. As will be explained below, mixer 13 produces a complex image at its mixer output (labeled M) on output line 15. This same image is fed back to switches 7 and 9 along a storage line 17. With switch 9 in the state shown, this mixer output image is stored in memory 5.

In view of these circuit arrangements, it can be readily understood that if the host computer operates switches 7 and 9 in unison, causign them to transit between the state illustrated in FIG. 1 and a second state in which the roles of memory devices 3 and 5 are interchanged, then the image stored from lines 15 and 17 can be used as the background image presented at the background input B of mixer 13. Thus, within the context of the present invention, memory devices 3 and 5 together with switches 7 and 9 can be viewed as a single addressable memory means for both storing a mixer output image and presenting a background mixer image.

An addressable memory 19 is used by the host computer to store an image density pattern known as alpha and symbolized by A, which controls the density of the painted color at each pixel location of the image. Memory 19 is coupled to the weight input W of mixer 13 by means of a multiplier 21. Although multiplier 21 uses the output of memory 19 to form a product as will be discussed below, it is possible to discuss at this point the way in which mixer 13 forms its output image at mixer output M.

The weight W input of mixer 13 controls the mixing ratio between the two input image data sources which are the background input B and the overlay input OV. If the data input at weight input W is zero, then the mixer output data at M is the same as the backgrond input B. If weight input W is a maximum (i.e., an all-ones binary code), then the W input is taken to be equivalent to a value of unity of 1, and the mixer output is the same as the overlay input OV. Between these extremes, that is, for values of W between 0 and 1, the mixer output is represented by a linear mixing equation:

$$M = [W \times OV] + [(1-W) \times B]$$

which can be alternatively expressed as:

$$M = B + (OV - B)W \qquad \text{(Equation 1)}$$

From these equations, it is possible to see that the image density pattern from memory 19 would have a direct, linear influence on the proportion of overlay (paint coloring) and background in the resultant image at mixer output M if the coupling between the output of memory 19 and the weight input W were a direct connection. That is, as the W input increases from zero, the proportion of overlay in the mixer output increases and the proportion of background decreases.

The above simple linear mixing relationship may in practice be altered to compensate for the non-linear relationship between signal magnitude and image brightness which is characteristic of video display devices. For example, lookup memories (not shown) may be used at the inputs and output of mixer 13 in order to perform a non-linear transformation on the data in order to compensate for video characteristics or to perform any other data compensation desired. Alternatively, such compensation with respect to the mixer input may be performed by the host computer when storing the image data.

An addressable memory 23 is used by the host computer to store image data concerning the degree of protection against overpainting which is associated with each pixel. Such image data defines a frisket, symbolized as F, since it amounts to the definition of a mask having a variable strength or density over the extent of the image.

The effect of this frisket data is to limit the density of painting which can take place at each pixel location. In particular, when F has a value of 0 (no masking or protection), then the density of painting is specified by the corresponding value of A. Conversely, when F is a maximum (complete masking or protection), painting is completely prevented. These consequences are produced by causing W, A, and F to be related by:

$$W = A(1-F)$$

Accordingly, a ones complementer 25 generates the term (1−F), while multiplier 21 generates the product of this term and A, supplying the result as the W input of mixer 13.

The output of mixer 13 on output line 15 is supplied to a display 27 which would typically include necessary digital-to-analog conversion, video circuits, and a display screen. Display 27 might also incorporate non-linear compensation like that discussed above with respect to the mixer 13 inputs as necessary.

A clock-driven address generator 29 synchronously supplies addresses to each of the memories 3, 5, 19, and 23 such that data from these memories is handled in a synchronous manner.

The circuit arrangement shown in FIG. 1 may be realized in practice by using standard available integrated circuit types. Register 1 which stores three 8-bit components of paint color (e.g., YUV) may be formed of three 8-bit registers such as 74LS374 registers for example. Memories 3, 5, 19, and 23 may be made up of TMS4161 video RAMs (Texas Instruments), using 72 of these circuits for each component (Y, U, V, A, and F) to be stored in the memory. Clock-driven address generator 29 can be realized by a TMS34010 graphic systems processor circuit. Ones complementer 25 can be a 16L8 PAL circuit. Multiplier 21 can be an ADSP1012 binary multiplier (Analog Devices, Inc.). Mixer 13 can be most efficiently realized from the above equation 1 by using a 74ALS534 circuit to form the ones complement of B, by using a pair of 74F283 4-bit adders to then derive the quality (OV−B), by using an ADSP1012 to form the product with W, and by using a second pair of 74F283's to sum with B.

Figure 2:
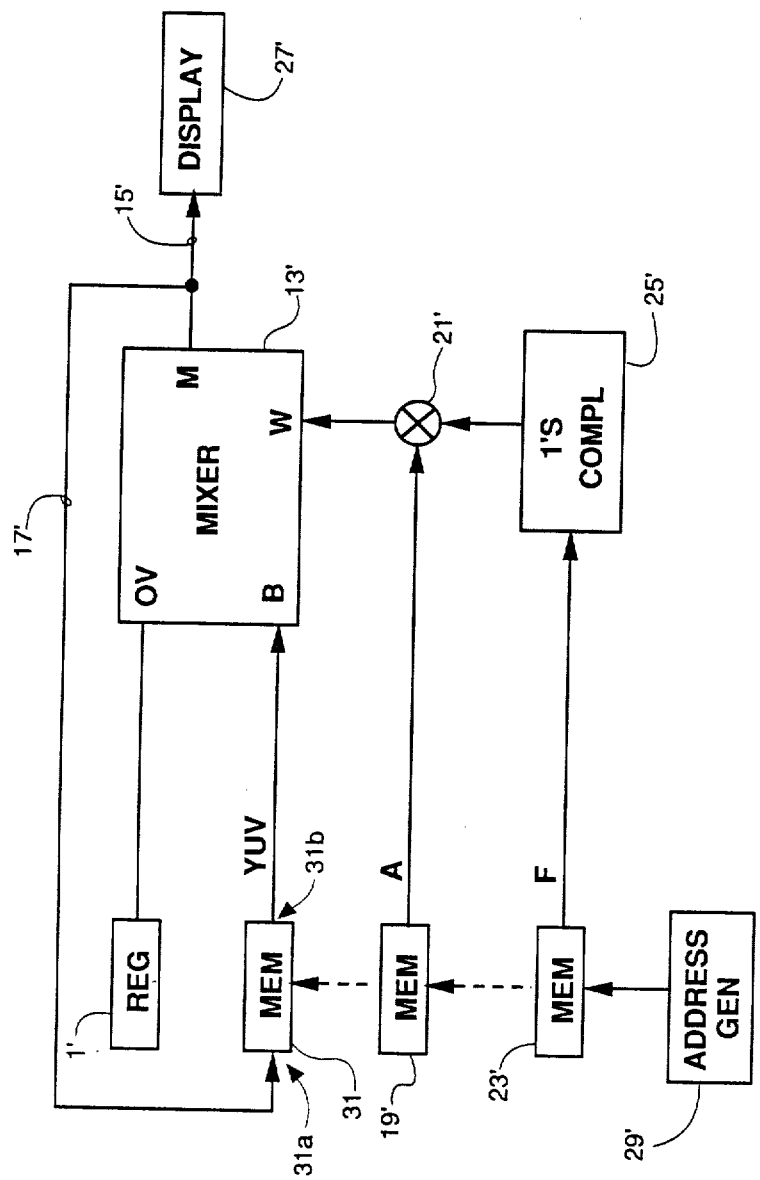
FIG. 2 is a block-schematic diagram of an alternative embodiment of the invention as it would be used for painting an overlay image.

FIG. 2 is an embodiment of the invention which is similar to FIG. 1 such that primed reference numbers have been used to indicate similar parts, the descriptions of which can be found in the material above concerning FIG. 1. In particular, the only portion of FIG. 2 which differs from the embodiment of FIG. 1 is the manner of providing a memory means for both storing the mixer output image on storage line 17 and presenting a background image at imput B of mixer 13'.

Whereas the embodiment of FIG. 1 provided this memory means in the form of two memory devices 3 and 5 together with switches 7 and 9, the embodiment of FIG. 2 employs a simultaneous read-write memory 31 having an input 31a and an output 31b. Memory 31 is thus able to output background image data to mixer 13 input B while simultaneously storing the resultant output image from mixer output M, such that it is ready to present this data as a succeeding background image. Memory 31 can be realized in practice using a Texas Instruments TMS4161 video ram circuit. In all other respects, the arrangement, function and operation of FIG. 2 are identical to that of FIG. 1.

Figure 3:
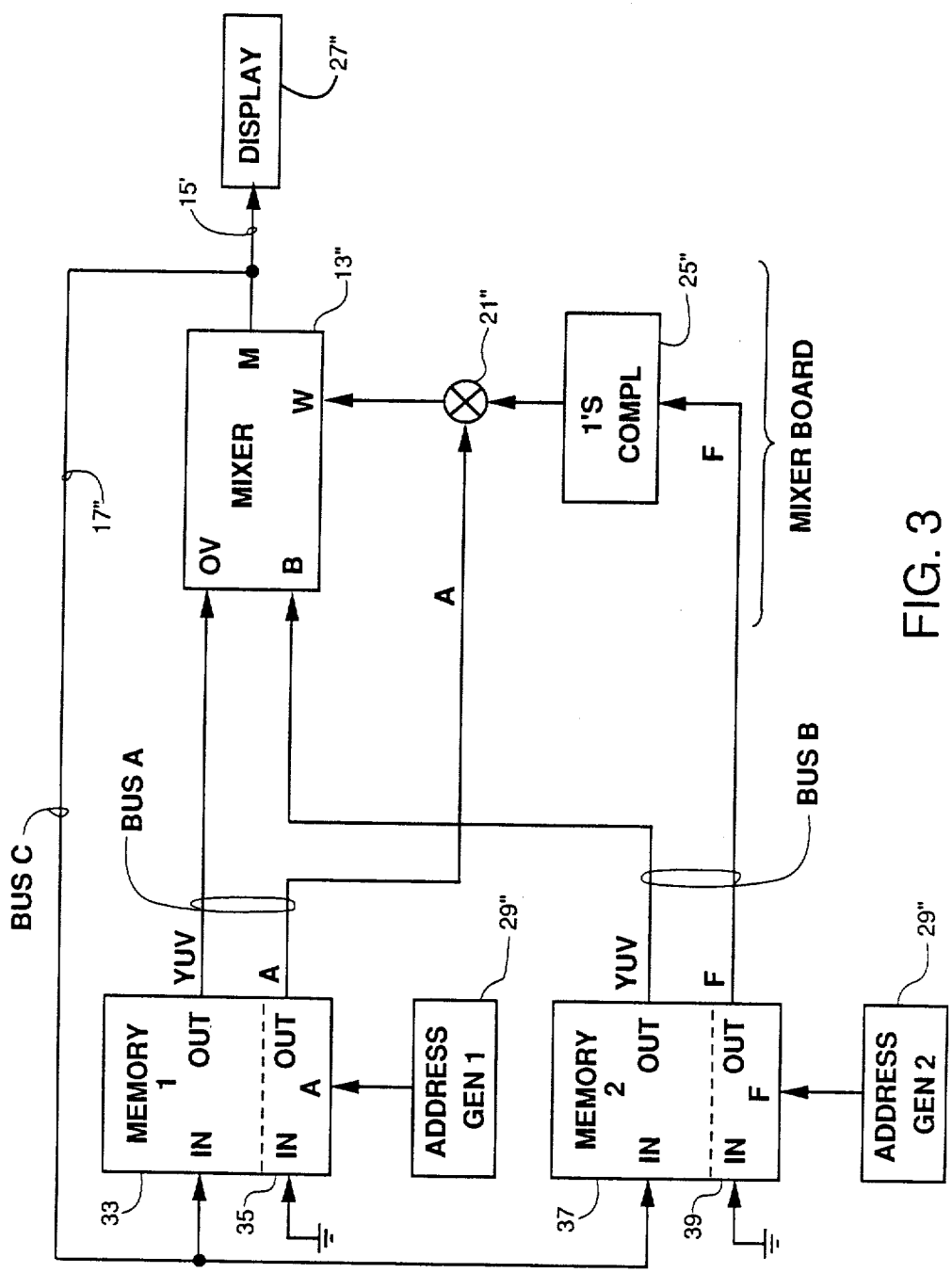
FIG. 3 is a block-schematic diagram of an alternative embodiment of the invention as it would be used for manipulating overlay images stored in an overlay memory.

Turning now to FIG. 3, an embodiment of the invention is illustrated which is adapted for adding and variously manipulating an overlay image stored in one memory and a background image in another memory. As in the case of FIG. 2, portions of FIG. 3 which are similar to those in FIG. 1 have been marked with doubly primed reference numerals.

Memory 33, for storing the three components YUV of an overlay image is shown paired with memory 35 which stores the associated alpha (A) value. Similarly, memory 37 for storing the YUV representation of a background image is shown associated with memory 39, which stores the frisket (F) data.

A pair of address generators 1 and 2, both numbered 29" are associated with the paired memories. Although these address generators are both similar to address generator 29 of FIG. 1, it will be understood that the provision of separate generates for the background and overlay images permits the operator, using host-computer software, to produce any needed degree of image shift of the overlay with respect to the background merely by commanding an offset of the scroll address of the two address generators.

Further, since memories 33 and 35 share address generator 1, the A values appropriate to the overlay image in memory 33 will move in unison with the overlay. Similarly, since memories 37 and 39 share address generator 2, the F values appropriate to mask or protect the background image will not move with respect to the background image.

It will be understood that memories 33 and 37 of FIG. 3 are simultaneous read-write memories of the same sort described as memory 31 in FIG. 2. Accordingly, it is possible to store the resultant image at mixer 13" output M in either of them for additional possibilities in image manipulation, since the resultant image at mixer output M can thus be either a background or overlay. Consequently, line 17" has been shown extending to the input of each of these memories in FIG. 3.

The inputs of memories 35 and 39 have been shown connected to ground, such that it is possible to easily clear these memories on hostcomputer command when their contents are no longer needed.

Figure 4:
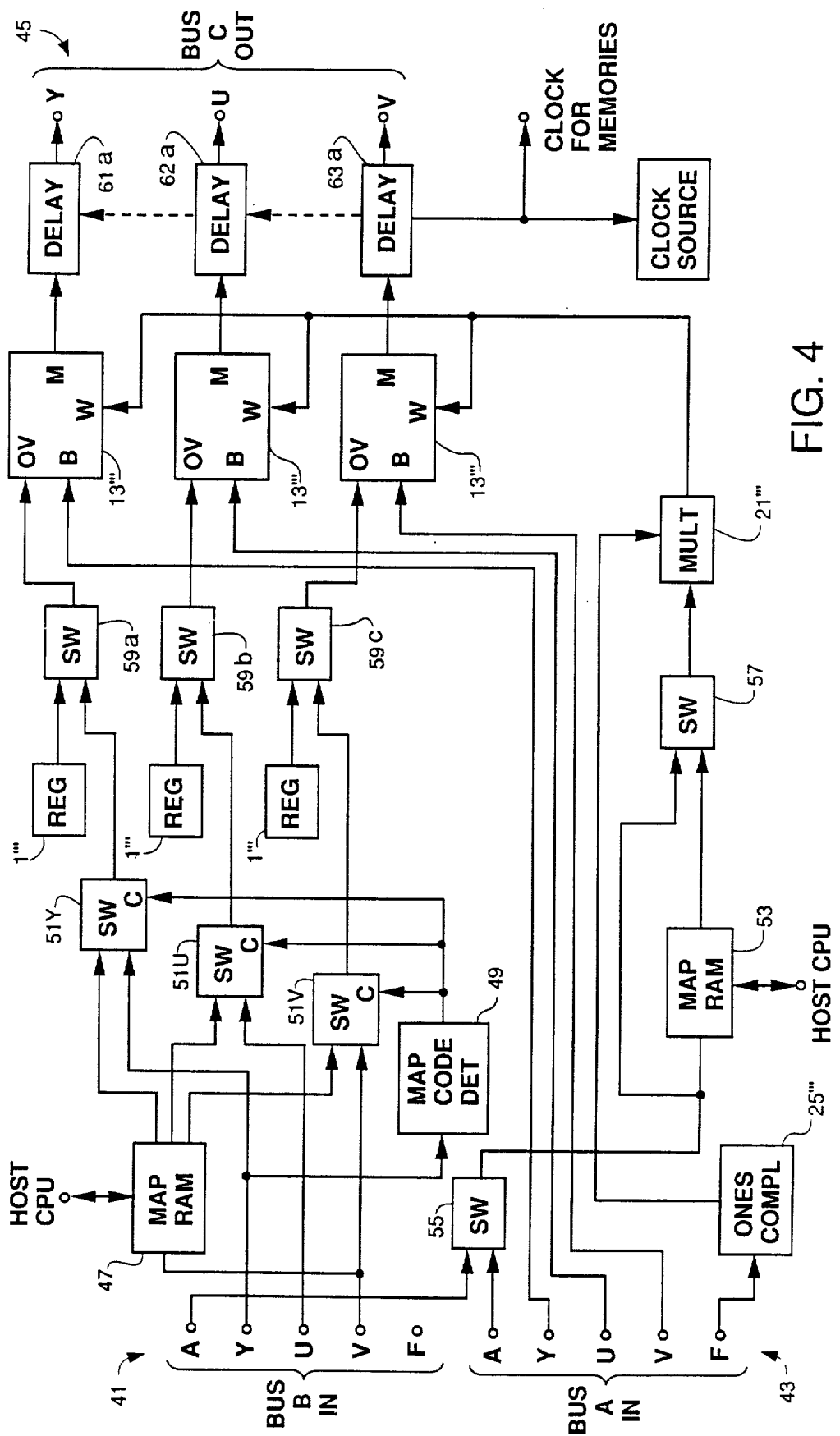
FIG. 4 is a block-schematic diagram of a mixer architecture useful in the embodiments of FIGS. 1-3 of the invention.

Turning now to FIG. 4 a mixer-board architecture useful in realizing the portions of FIGS. 1-3 exclusive of the memories, address generators and display is shown. As shown the architecture is structured around the use of three busses 41, 43, and 45. Bus 41, normally used for the overlay image, represents this image by the five components: YUV, A, and F. Since each of these components is an 8-bit quantity, bus 41 may consist of 5 groups of lines, each having 8 lines. Bus 43 is identical, and is normally used to carry the background image. Similarly, although bus 45 uses only 3 of the groups to carry output images in their YUV color triad, it is identically constructed.

A map RAM 47, containing for example 256 different colors loaded therein by the host computer can be used for very convenient color manipulation of the overlay image in the following manner. A map-code detector 49 is used to monitor the incoming Y-component of bus 41, such that when it detects a map code, which might be a value of 2 to 4 for example, it drives three switches 51Y, 51U, and 51V into a state such that they substitute YUV color components from a map RAM 47 in place of the incoming YUV codes on bus 41. The particular address in map RAM 47 is encoded as the V component on bus 41.

In the absence of map code on the Y component group of bus 41, each of the YUV groups contains the usual color components, which are passed directly through switches 51. Since any pixel can have a mapped or a non-mapped value, it is possible to alter the definitions of any mapped colors without affecting the unmapped ones merely by redefining the colors in map 47.

Similarly, it is possible to remap the alpha (A) values to be used in the mixing operation by the use of an additional map RAM 53 in which map values are also written by the host computer. A switch 55 permits this function to be implemented with respect to either the A value on bus 41 or bus 43. Similarly, a switch 57 permits either the mapped or unmapped value of A to be used. In this way it is possible to perform a non-linear transformation of A values such as to approximate the compensation needed to match the non-linear relationship of brightness and signal magnitude in video devices as discussed earlier in this application.

Switches 59a, b, and c serve to permit the substitution of YUV color components from 3 registers 1''' similar to register 1 of FIG. 1, such that when the host-computer software directs, painting operations as discussed in respect to FIG. 1 can be carried out.

Delays 61a, b, and c serve to provide sufficient delay in the bus 45 output such that the signals thereon can arrive for storage in memories such as 31 in FIG. 2 or 33 or 37 in FIG. 3 at the correct time such that storage can take place one display scan line behind reading, which simplifies a problem of unavoidable delay which occurs in the circuit arrangements.

Although this invention has been described with some particularity, it is not intended that its scope be limited thereby. The scope of the invention is to be determined only by the following claims.

We claim:

1. In a system for producing, controlling and manipulating a background image and a first overlay image for simultaneous display on a raster-type display device,
   a first addressable memory means for storing data representing the density pattern of said overlay image at a plurality of points along each of the raster lines of said raster-type display device;
   a register means for storing data representing a color to be used in displaying said overlay image;
   a proportional mixer means, having a first input coupled to said first memory means to receive said overlay image density data, having a second input coupled to receive said background image as data representing said background image at said plurality of points along each of the raster lines of said raster-type display device, having a register input coupled to receive color data from said register, and having a display output for connection to said display device, for producing in response to said first, second and register inputs a composite display output image having said overlay image in said selected color mixed into said background image at each of said plurality of points in proportion to the density of color represented by said overlay image density data;
   a second addressable memory means for storing a second image as data representing said second image at said plurality of points along each of the raster lines of said raster-type display device, said second addressable memory means being coupled to said second mixer input to supply said second image as said background image, and being coupled to said mixer display output to store said output image therefrom as a succeeding second image;
   first clock-driven address generator means coupled to each of said memory, register, and mixer means to synchronously cause: (1) said overlay and background image data to be serially presented at said first and second mixer inputs, respectively, and (2) said display output image data to be serially stored in said second memory means.

2. The apparatus of claim 1 wherein said second addressable memory means comprises a simultaneous read-write memory device having an input terminal connected to said mixer display output for serially receiving and storing data representing said mixer output image, and having an output terminal connected to said mixer background input for serially presenting stored data representing said background image, said memory device responding, at each address generated by said first clock-driven address generator, by first presenting stored data to its output terminal and then storing new data from its input terminal.

3. The apparatus of claim 2 further including:
   a third addressable memory means for storing a frisket image as data representing, at each of said plurality of points along each of the raster lines of said raster-type display device, the maximum permissible density of overlay image;
   a first multiplier means coupled to receive data from said first and third memory means for generating a binary product therefrom, said multiplier means being further connected to said mixer first input to supply said binary product thereto to control the density of overlay image at each of said plurality of points along each of the raster lines of said raster-type display device.

4. The apparatus according to claim 3 further including a density-mapping memory means coupled between said first memory means and said mixer weight input for converting density data input from said first memory means into density data output to said mixer weight input according to a preselected non-linear relationship.

5. The apparatus according to claim 4 further including three separate bus structures extending between and interconnecting said addressable memory means and said mixer for communicating said overlay, background and display output data therebetween, and a digital delay means coupled between said mixer display output and said second addressable memory means to delay storage of said display output image in said second memory means.

6. The apparatus of claim 3 further including a binary ones complementer, connected between said third addressable memory means and said multiplier means, for deriving the ones complement of said data representing said frisket image and presenting said ones complemented data to said multiplier, whereby at each of said plurality of points frisket data of a zero or minimum magnitude permits maximum overlay density and frisket data of maximum magnitude causes overlay density to be zero.

7. The apparatus of claim 1 wherein said second addressable memory means comprises:
   a second addressable memory device for storing said second image as data representing said second image at said plurality of points along each of the raster lines of said raster-type display device;
   a third addressable memory device for storing a third image as data representing said third image at said plurality of points along each of the raster lines of said raster-type display device;
   switch means connected to said second and third memory devices and to said mixer first input and said mixer output, said switch means being selectively operable between a first state in which said second memory device is connected to said first mixer input to supply said background image thereto and said third memory device is connected to said mixer output to store said display output image, and a second state in which said third memory device is connected to said first mixer input to supply said background image thereto and said second memory device is connected to said mixer output to store said display output image.

8. The apparatus of claim 7 further including:
a third addressable memory means for storing a frisket image as data representing, at each of said plurality of points along each of the raster lines of said raster-type display device, the maximum permissible density of overlay image;
a first multiplier means coupled to receive data from said first and third memory means for generating a binary product therefrom, said multiplier means being further connected to said mixer first input to supply said binary product thereto to control the density of overlay image at each of said plurality of points along each of the raster lines of said raster-type display device.

9. The apparatus according to claim 8 further including a density-mapping memory means coupled between said first memory means and said mixer weight input for converting density data input from said first memory means into density data output to said mixer weight input according to a preselected non-linear relationship.

10. The apparatus of claim 8 further including a binary ones complementer, connected between said third addressable memory means and said multiplier means, for deriving the ones complement of said data representing said frisket image and presenting said ones complemented data to said multiplier, whereby at each of said plurality of points frisket data of a zero or minimum magnitude permits maximum overlay density and frisket data of maximum magnitude causes overlay density to be zero.

11. The apparatus of claim 1 further including:
a third addressable memory means for storing a frisket image as data representing, at each of said plurality of points along each of the raster lines of said raster-type display device, the maximum permissible density of overlay image;
a first multiplier means coupled to receive data from said first and third memory means for generating a binary product therefrom, said multiplier means being further connected to said mixer first input to supply said binary product thereto to control the density of overlay image at each of said plurality of points along each of the raster lines of said raster-type display device.

12. The apparatus of claim 11 further including a binary ones complementer, connected between said third addressable memory means and said multiplier means, for deriving the ones complement of said data representing said frisket image and presenting said ones complemented data to said multiplier, whereby at each of said plurality of points frisket data of a zero or minimum magnitude permits maximum overlay density and frisket data of maximum magnitude causes overlay density to be zero.

13. The apparatus according to claim 1 further including a density-mapping memory means coupled between said first memory means and said mixer weight input for converting density data input from said first memory means into density data output to said mixer weight input according to a preselected non-linear relationship.

14. In a system for producing, controlling and manipulating a background image and a first overlay image for simultaneous display on a raster-type display device,
a first addressable memory means for storing data representing said background image at a plurality of points along each of the raster lines of said raster-type display device;
a second addressable memory means for storing data representing said overlay image at said plurality of points along each of the raster lines of said raster-type display device;
a third addressable memory means for storing data representing the density pattern of said overlay image at said plurality of points along each of the raster lines of said raster-type display device;
a proportional mixer means, having a background input coupled to said first memory means to receive said background image data, having an overlay input coupled to said second memory means to receive said overlay image data, having a weight input coupled to said third memory means to receive said overlay-image density pattern data, and having a display output for connection to said display device, for producing in response to said background, overlay and weight inputs a composite display output image having said overlay image mixed into said background image at each of said plurality of points in proportion to the density represented by said overlay-image density pattern data;
said first addressable memory means coupled to said mixer background input is further coupled to said mixer display output to store said output image therefrom as a succeeding background image;
first clock-driven address generator means coupled to each of said memory and mixer means to synchronously cause: (1) said background and overlay image and density pattern data to be serially presented at said overlay, background, and weight mixer inputs, respectively, and, on user command, (2) said display output image data to be serially stored in said first memory means.

15. The apparatus of claim 14 wherein said first addressable memory means comprises a simultaneous read-write memory device having an input terminal connected to said mixer display output for serially receiving and storing data representing said mixer output image, and having an output terminal connected to said mixer background input for serially presenting stored data representing said background image, said memory device responding, at each address generated by said first clock-driven address generator, by first presenting stored data to its output terminal and then storing new data from its input terminal.

16. The apparatus according to claim 15 further including three separate bus structures extending between and interconnecting said addressable memory means and said mixer for communicating said overlay, background and display output data.

17. The apparatus according to claim 16 wherein each of said bus structures is made up of five groups of data lines for representing five image data components.

18. The apparatus according to claim 17 further including a plurality of data storage registers connected to ones of said five groups for storing constants which can be selectively substituted for corresponding ones of said image data components.

19. The apparatus of claim 14 wherein said first addressable memory means comprises:
- a first addressable memory device for storing a first image as data representing said first image at said plurality of points along each of the raster lines of said raster-type display device;
- a second addressable memory device for storing a second image as data representing said second image at said plurality of points along each of the raster lines of said raster-type display device;
- switch means connected to said first and second memory devices and to said mixer background input and said mixer output, said switch means being selectively operable between a first state in which said first memory device is connected to said mixer background input to supply said background image thereto and said second memory device is connected to said mixer output to store said display output image, and a second state in which said second memory device is connected to said mixer background input to supply said background image thereto and said first memory device is connected to said mixer output to store said display output image.

20. The apparatus of claim 14 further including:
- a fourth addressable memory means for storing a frisket image as data representing, at each of said plurality of points along each of the raster lines of said raster-type display device, the maximum permissible density of overlay image;
- a first multiplier means coupled to receive data from said third and fourth memory means for generating a binary product therefrom, said multiplier means being further connected to said mixer weight input to supply said binary product thereto to control the density of overlay image at each of said plurality of points along each of the raster lines of said raster-type display device.

21. The apparatus of claim 20 further including scroll-offset means to generate an address which is selectively offset from the address generated by said first clock-driven address generator, said scroll-offset means being coupled to said first and fourth addressable memory means to present said selectively offset address thereto, to thereby permit selective variation of the position of said overlay image relative to said background and output display images.

22. The apparatus of claim 21 wherein said scroll-offset means comprises a second clock-driven address generator independent from said first clock-driven address generator.

23. The apparatus of claim 21 further including a binary ones complementer, connected between said fourth addressable memory means and said multiplier means, for deriving the ones complement of said data representing said frisket image and presenting said ones complemented data to said multiplier, whereby at each of said plurality of points frisket data of a zero or minimum magnitude permits maximum overlay density and frisket data of maximum magnitude causes overlay density to be zero.

24. The apparatus of claim 21 wherein said first addressable memory means comprises a simultaneous read-write memory device having an input terminal connected to said mixer display output for serially receiving and storing data representing said mixer output image, and having an output terminal connected to said mixer background input for serially presenting stored data representing said background image, said memory device responding, at each address generated by said scroll-offset means, by first presenting stored data to its output terminal and then storing new data from its input terminal, and further including a binary ones complementer, connected between said fourth addressable memory means and said multiplier means, for deriving the ones complement of said data representing said frisket image and presenting said ones complemented data to said multiplier, whereby at each of said plurality of points frisket data of a zero or minimum magnitude permits maximum overlay density and frisket data of maximum magnitude causes overlay density to be zero.

25. The apparatus according to claim 20 further including a density-mapping memory means coupled between said third memory means and said multiplier for converting density data input from said third memory means into density data output to said multiplier according to a preselected non-linear relationship.

26. The apparatus according to claim 14 further including a density-mapping memory means coupled between said third memory means and said mixer weight input for converting density data input from said third memory means into density data output to said mixer weight input according to a preselected non-linear relationship.

27. The apparatus according to claim 26 further including a color-mapping memory means coupled between said second memory means and said mixer overlay input for converting color data input from said second memory means into color data output to said mixer overlay input according to a preselected relationship.

28. The apparatus according to claim 27 further including map-code-detecting switch means, coupled to said second memory means and to said mixer overlay input and having a first state in which overlay data from said second memory means is routed to said mixer overlay input and a second state in which color-mapped overlay data from said color-mapping memory means is routed to said mixer overlay input, said map-code-detecting switch means being responsive to a predetermined map code in said overlay image output data by transiting from said first state to said second state.

29. The apparatus according to claim 14 further including a color-mapping memory means coupled between said second memory means and said mixer overlay input for converting color data input from said second memory means into color data output to said mixer overlay input according to a preselected relationship.

30. The apparatus according to claim 29 further including map-code-detecting switch means, coupled to said second memory means and to said mixer overlay input and having a first state in which overlay data from said second memory means is routed to said mixer overlay input and a second state in which color-mapped overlay data from said color-mapping memory means is routed to said mixer overlay input, said map-code-detecting switch means being responsive to a predetermined map code in said overlay image output data by transiting from said first state to said second state.

31. The apparatus according to claim 14 further including a digital delay means coupled between said mixer display output and said first addressable memory means to delay storage of said display output image in said first memory means.

* * * * *